(12) United States Patent
Perkins et al.

(10) Patent No.: US 12,424,742 B2
(45) Date of Patent: Sep. 23, 2025

(54) BEAM STEERING AND DIRECTION FINDING FOR A DIFFERENTIALLY SEGMENTED APERTURE ANTENNA

(71) Applicant: Battelle Memorial Institute, Columbus, OH (US)

(72) Inventors: Daniel A. Perkins, Lewis Center, OH (US); Raphael J. Welsh, Powell, OH (US); Douglas A. Thornton, Columbus, OH (US); Jeffrey A. Lau, Fairfax, VA (US); Daniel G. Loesch, Sunbury, OH (US); Damian B. Fedoryka, Gainesville, VA (US); Roger Kanke, Columbus, OH (US); Shannon Pitts, Dublin, OH (US)

(73) Assignee: Battelle Memorial Institute, Columbus, OH (US)

( * ) Notice: Subject to any disclaimer, the term of this patent is extended or adjusted under 35 U.S.C. 154(b) by 469 days.

(21) Appl. No.: 18/050,552

(22) Filed: Oct. 28, 2022

(65) Prior Publication Data

US 2023/0133302 A1   May 4, 2023

Related U.S. Application Data

(60) Provisional application No. 63/273,344, filed on Oct. 29, 2021, provisional application No. 63/273,434, (Continued)

(51) Int. Cl.
*H01Q 3/36* (2006.01)
*H01Q 21/06* (2006.01)
*H01Q 21/29* (2006.01)

(52) U.S. Cl.
CPC .............. *H01Q 3/36* (2013.01); *H01Q 21/06* (2013.01); *H01Q 21/29* (2013.01)

(58) Field of Classification Search
CPC .......... H01Q 3/36; H01Q 21/06; H01Q 21/29; H01Q 13/085; H01Q 21/064; H01Q 3/30
See application file for complete search history.

(56) References Cited

U.S. PATENT DOCUMENTS 3,295,134 A * 12/1966 Lowe ....................... H01Q 3/40
342/368
5,933,115 A * 8/1999 Faraone ............... H01Q 9/0428
343/700 MS (Continued)

FOREIGN PATENT DOCUMENTS

WO   2020219794 A1   10/2020

OTHER PUBLICATIONS

International Search Report and Written Opinion of International Application No. PCT/US22/78841, mail date Mar. 14, 2023, 15 pages.

(Continued)

*Primary Examiner* — Dameon E Levi
*Assistant Examiner* — Jordan E. DeWitt
(74) *Attorney, Agent, or Firm* — Grossman, Tucker, Perreault & Pfleger, PLLC; Donald G. Weiss

(57) ABSTRACT

A beam steering system includes a differential segmented array (DSA) antenna comprising a plurality of pyramid structures and elements arranged in an array comprising a first and second set of direction elements, where each element is defined between opposing faces of two adjacent pyramid structures and a position of each element is located at a distance from a common origin of the elements of the array; phase gradient determination circuitry to determine a first and second phase gradient for the direction elements, where the phase gradients are based on a first and a second angle of a target with respect to the DSA antenna, and an operating frequency of the DSA antenna; and phase shift determination circuitry to determine a first and second phase (Continued)

shift, for each of the elements, and to determine a resultant phase shift, for each element, by summing the respective first and second phase shifts.

20 Claims, 10 Drawing Sheets

Related U.S. Application Data filed on Oct. 29, 2021, provisional application No. 63/273,352, filed on Oct. 29, 2021.

(56) References Cited

U.S. PATENT DOCUMENTS

| | | | | |
|---|---|---|---|---|
| 6,188,922 | B1* | 2/2001 | Mistretta | G01R 33/56308 |
| | | | | 324/306 |
| 6,621,469 | B2 | 9/2003 | Judd et al. | |
| 8,648,759 | B2* | 2/2014 | Wang | H01Q 1/286 |
| | | | | 343/820 |
| 10,056,699 | B2* | 8/2018 | Elsallal | H01Q 1/48 |
| 11,909,117 | B1* | 2/2024 | Thornton | H01Q 21/24 |
| 12,249,771 | B2* | 3/2025 | Perkins | H01Q 13/085 |
| 2003/0214450 | A1* | 11/2003 | Lynch | H01Q 21/0087 |
| | | | | 343/772 |
| 2006/0038732 | A1* | 2/2006 | DeLuca | H01Q 21/064 |
| | | | | 343/754 |
| 2006/0284727 | A1* | 12/2006 | Steinke | G06K 19/0723 |
| | | | | 342/127 |
| 2013/0033404 | A1* | 2/2013 | Abe | H01Q 21/005 |
| | | | | 343/776 |
| 2014/0210668 | A1* | 7/2014 | Wang | H01Q 3/34 |
| | | | | 342/372 |
| 2019/0154439 | A1* | 5/2019 | Binder | G01S 13/878 |
| 2020/0253096 | A1* | 8/2020 | McBain | H05K 9/0088 |
| 2020/0343927 | A1 | 10/2020 | Welsh et al. | |
| 2020/0343929 | A1* | 10/2020 | Welsh | H01Q 1/44 |
| 2021/0249782 | A1* | 8/2021 | Angeletti | H01Q 25/00 |
| 2023/0032553 | A1* | 2/2023 | McBain | H05K 9/009 |
| 2023/0133302 | A1* | 5/2023 | Perkins | H01Q 21/06 |
| | | | | 342/372 |
| 2023/0138769 | A1* | 5/2023 | Welsh | H01Q 13/085 |
| | | | | 342/175 |

OTHER PUBLICATIONS

Adesh Panwar, et al., "FPGA Based Phase Gradient Controller for Phased Array Radar Antenna", 11th International Radar Symposium India, Nimhans Convention Centre, Bangalore, India, Dec. 2017, 4 pages.

G. D'Amato, G. Avitabile, G. Coviello and C. Talarico, "A beam steering unit for active phased-array antennas based on FPGA synthesized delay-lines and PLLs," 2015 International Conference on Synthesis, Modeling, Analysis and Simulation Methods and Applications to Circuit Design (SMACD), Istanbul, 2015, pp. 1-4, doi: 10.1109/SMACD.2015.7301709.

G. D'Amato, G. Piccinni, G. Avitabile, G. Coviello and C. Talarico, "An integrated phase shifting frequency synthesizer for active electronically scanned arrays", Proc. 21st Int. Symp. Design Diagnostics Electron. Circuits Syst. (DDECS), pp. 91-94, Apr. 2018.

G. D'Amato, G. Avitabile, G. Coviello and C. Talarico, "DDS-PLL Phase Shifter Architectures for Phased Arrays: Theory and Techniques," in IEEE Access, vol. 7, pp. 19461-19470, 2019, doi: 10.1109/ACCESS.2019.2895388.

G. D'Amato, G. Avitabile, G. Coviello and C. Talarico, "Toward a novel architecture for beam steering of active phased array antennas," 2016 IEEE 59th International Midwest Symposium on Circuits and Systems (MWSCAS), Abu Dhabi, 2016, pp. 1-4, doi: 10.1109/MWSCAS.2016.7870074.

International Search Report and Written Opinion from corresponding PCT Appln. No. PCT/US2022/078843, dated Feb. 8, 2023. 10 pages.

International Preliminary Report on Patentability from corresponding PCT Appln. No. PCT/US2022/078841, mail date May 10, 2024. 11 pages.

International Preliminary Report on Patentability from corresponding PCT Appln. No. PCT/US2022/078843, mail date May 10, 2024. 8 pages.

\* cited by examiner

BEAM STEERING AND DIRECTION FINDING FOR A DIFFERENTIALLY SEGMENTED APERTURE ANTENNA

CROSS-REFERENCE TO RELATED APPLICATIONS

The present application claims the benefit of the filing date of U.S. Provisional Application Ser. No. 63/273,344, filed Oct. 29, 2021, U.S. Provisional Application Ser. No. 63/273,352, filed Oct. 29, 2021, and U.S. Provisional Application Ser. No. 63/273,434, filed Oct. 29, 2021, the entire teachings of which applications are hereby incorporated herein by reference.

TECHNICAL FIELD

The present disclosure relates to beam steering and direction finding for a differential segmented array (DSA) antenna.

BACKGROUND

Beamforming is the application of multiple radiating elements transmitting the same signal at the same wavelength and phase, which effectively creates a single antenna with a longer, more targeted stream. Beam steering takes the concept of beam forming a stage further, by changing the phase of the input signal on all radiating elements. This allows the signal to be targeted at a specific receiver. An antenna can employ radiating elements with a common frequency to steer a single beam in a specific direction, or different frequency beams can be steered in different directions to serve different users. Beam steering is playing significant role in 5G communication because of range limitations combined with high usage of the 5G network.

BRIEF DESCRIPTION OF THE DRAWINGS

Reference should be made to the following detailed description which should be read in conjunction with the following figures, wherein like numerals represent like parts.

DETAILED DESCRIPTION

Figure 1A:
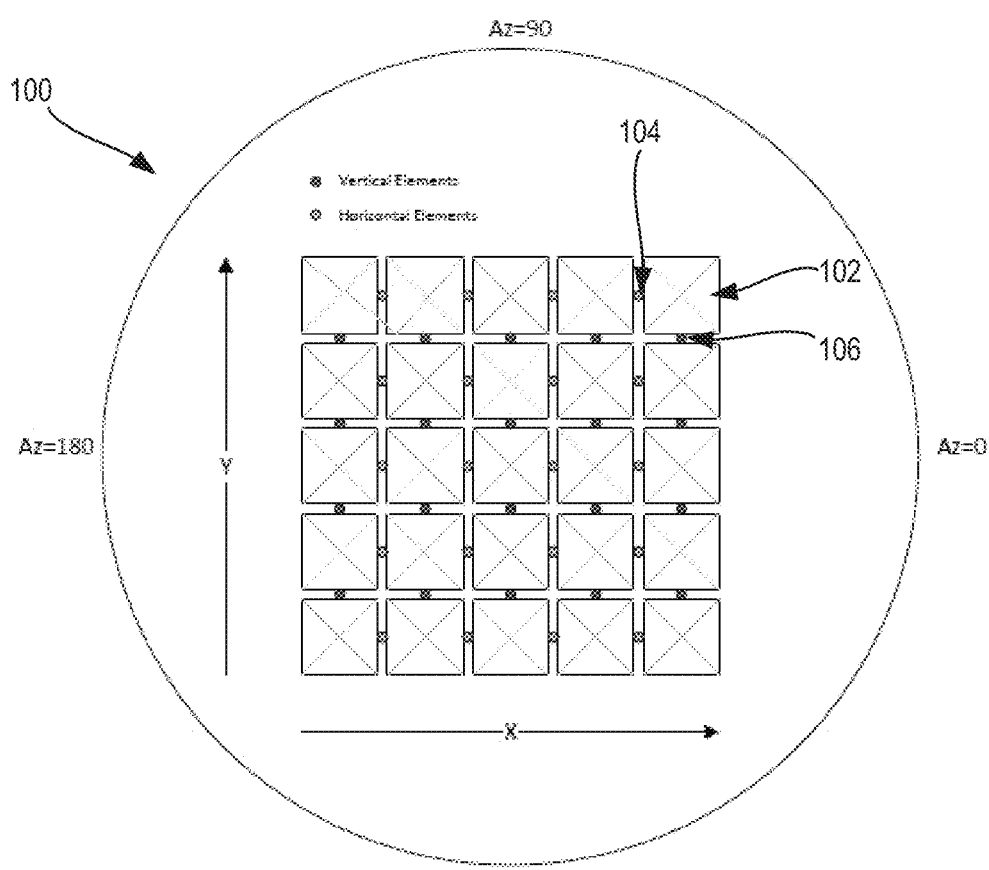
FIGS. 1A, 1B, and 1C illustrate various views of a differential segmented array (DSA) antenna according to several embodiments of the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Disclosed herein are a beam steering system and a demonstration beam steering system based on a DSA.

Figure 1B:
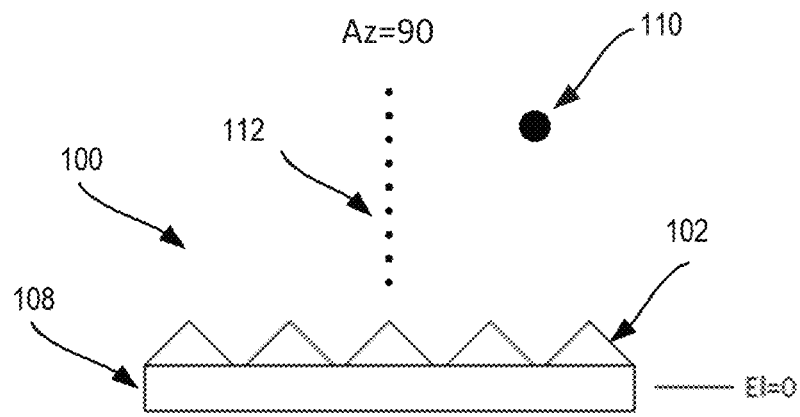
Figure 1C:
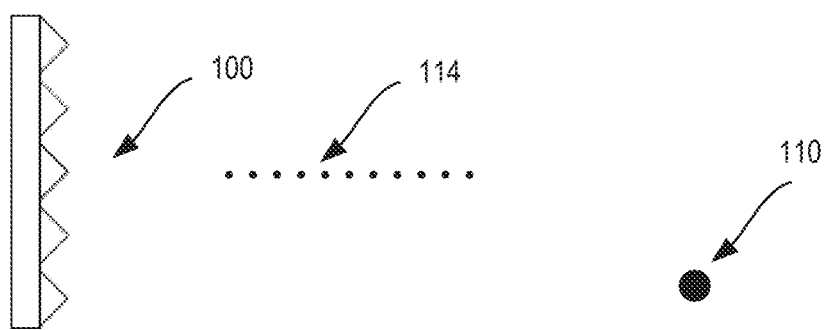

FIGS. 1A, 1B and 1C illustrate various views of a DSA antenna 100 according to several embodiments of the present disclosure. FIG. 1A illustrates a top-down view of an example DSA antenna 100. The antenna 100 includes a plurality of protrusions, which in the examples herein are generally pyramid structures, arranged in an array, and one exemplary pyramid structure is labeled 102. In the example of FIG. 1A, the antenna 100 has 5 rows and 5 columns (5×5) of pyramid structures. At least one face of each pyramid structure faces an adjacent pyramid structure, as illustrated. Opposing faces of two adjacent pyramid structures form an antenna element 104, 106. Element 104 is designated as a horizontal element, and element 106 is designated as a vertical element. Given that there are 5 rows and 5 columns (5×5) of pyramid structures in this example, there are 5 rows of horizontal elements 104, and each row includes 4 columns of horizontal elements 104. Thus, the horizontal elements 104 form a (5×4) array, totaling 20 horizontal elements. Also given that there are 5 rows and 5 columns (5×5) of pyramid structures in this example, there are 5 columns of vertical elements 106, and each column includes 4 rows of vertical elements 106. Thus, the vertical elements 106 form a (4×5) array, totaling 20 vertical elements. Thus, vertical and horizontal elements 104, 106 are arranged in an (m×n) array, having m number of rows and n number of columns of elements. In the example of FIG. 1A, the vertical elements 106 are formed in columns along the X-axis, and the horizontal elements 104 are formed in rows along the Y-axis. In some embodiments, the pyramid structures are generally identical to one another, and are also generally equidistant from each other, for example, each element is 1" apart from the adjacent element. The electromagnetic position of an element 104, 106 is the phase center for that element. Each phase center represents a transmission (Tx) and reception (Rx) point for signals transmitted by, or received by, an element.

FIG. 1B illustrates a cross-sectional view of the array 100, illustrating the pyramid-shaped structures 102 formed on a base dielectric layer 108. FIG. 1B also illustrates the DSA antenna array 100 in a position for communication (RX and/or TX) with a target 110. The target 100 is positioned at an angle of elevation ("El.Ang.") and an angle of azimuth ("Az.Ang.") with respect to the X-Y plane of the array 100. In this example, the Az.Ang. is the angle of the target 110 with respect to an axis 112 normal to the front face of the array in the X direction. FIG. 1C also illustrates a cross-sectional view of the array 100 in a position for communication (RX and/or TX) with the target 110. In this example, the El.Ang. is the angle of the target 110 with respect to an axis 114 normal to the front face of the array in the Y direction. As will be described in greater detail below, the elements 104, 106 of the array 100 may be controlled to impart a phase shift for Rx and/or Tx communication with the target 110 to optimize signal gain between the array 100 and the target 110.

Figure 2:
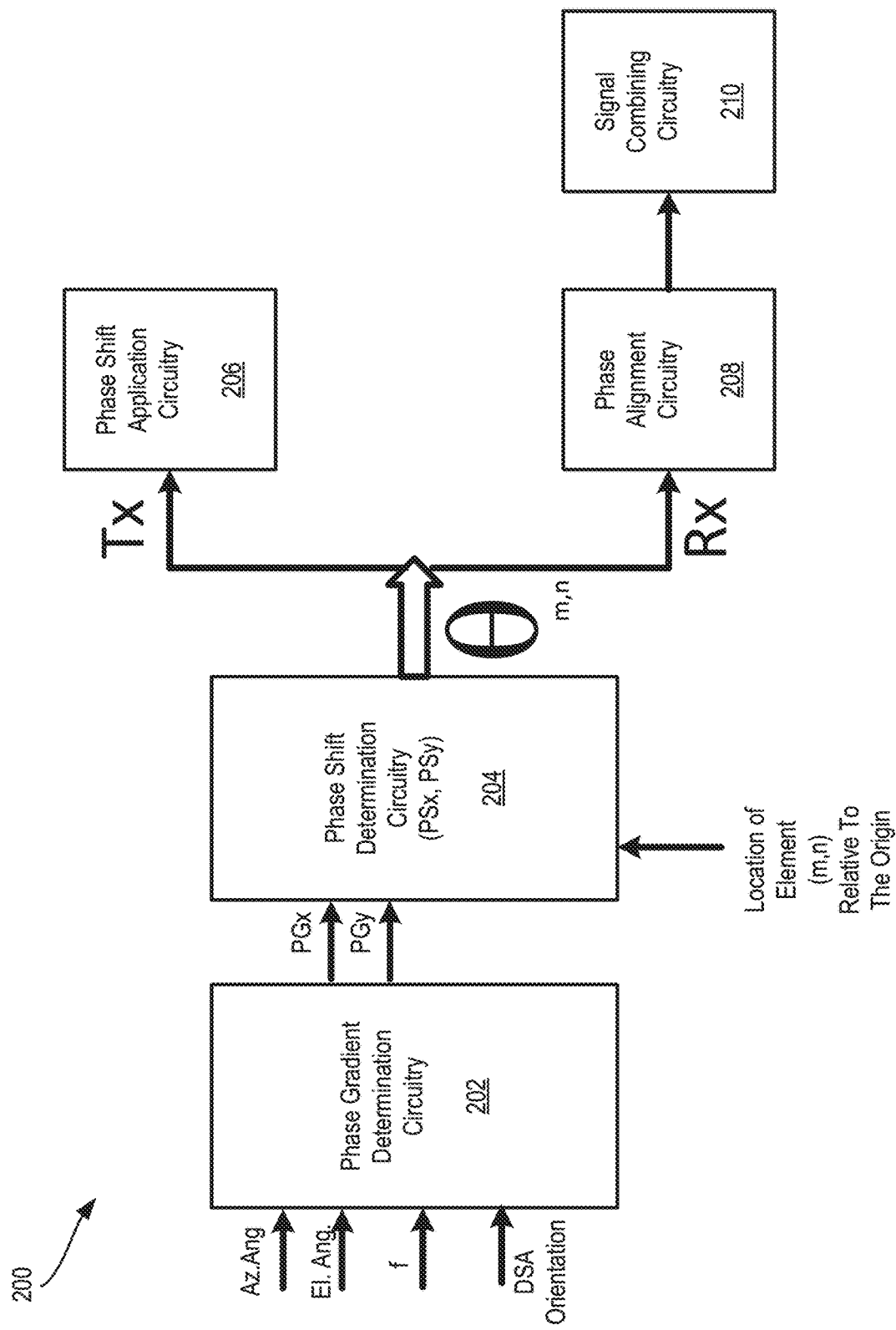
FIG. 2 illustrates beam steering circuitry according to several embodiments of the present disclosure.

FIG. 2 illustrates beam steering circuitry 200 according to several embodiments of the present disclosure. As a general matter, and with continued reference to FIGS. 1A, 1B and 1C, the azimuth and/or elevation angle of the target 110 relative to the orientation of the array 100 generally operates to affect the gain of the signal in both Rx and Tx operations in the direction of the target 110. For example, the peak gain of the array generally exists where the beam pattern of the array 100, specifically a main lobe of the beam pattern, is pointed at the target 110. Accordingly, the beam steering circuitry 200 is generally configured to impart a phase angle on each of the elements (104, 106) so that, in effect, the array is pointing directly at the target 110 (and without physical movement of the array 110) to maximize communication gain between the array 100 and target 110.

The beam steering circuitry 200 includes phase gradient determination circuitry 202 generally configured to determine a phase gradient across the array (in both X and Y dimensions) to maximize signal strength between the array and the target. The phase gradient is based on the azimuth and elevation angle of the target with respect to the array, a frequency of operation (f) and the orientation of the DSA array with respect to the target. The phase gradient in the X direction across the array (PGx) may be determined using Formula (1).

$$PGx = \cos(Az.Ang.) * -\cos(El.Ang.) * (360/(\text{wavelength} (f))) \quad (1)$$

In Formula (1), wavelength(f) may be determined as c/f, expressed in distance units (e.g., inch, mm, etc.), and c is the speed of light, as may be modified by a given medium. Thus, the units of PGx are expressed as (degrees/distance). PGx is applied to each row of horizontal elements illustrated in FIG. 1A, as described below.

Similarly, the phase gradient in the Y direction across the array (PGy) may be determined using Formula (2).

$$PGy = \sin(Az.Ang.) * -\cos(El.Ang.) * (360/(\text{wavelength} (f))) \quad (2)$$

In Formula (2), wavelength(f) may be determined as c/f, expressed in distance units (e.g., inch, mm, etc.), and c is the speed of light, as may be modified by a given medium. Thus, the units of PGy are expressed as (degrees/distance). PGy is applied to each column of vertical elements illustrated in FIG. 1A, as described below.

Phase shift determination circuitry 204 is configured to determine a phase shift to apply to each respective element 104, 106 in the array 100, based on the phase gradients PGx and PGy, and also based on a position of the element relative to a common origin of the elements of the array. The common origin may be any position with respect to the array 100 that is common to all of the elements, i.e., each element (m, n) has a defined distance from the common origin. For example, the common origin may be selected as the center of the array 100, the lower left corner of the array 100, etc. For each horizontal element, the phase shift determination circuitry 204 is configured to determine a phase shift for a given phase center by multiplying the PGx phase gradient by the position of the element relative to the common origin of the elements of the array, thus resulting in a value $\theta(m, n)x$ expressed in terms of degrees. Similarly, for each vertical element, the phase shift determination circuitry 204 is configured to determine a phase shift for a given element by multiplying the PGy phase gradient by the position of the element relative to the common origin of the elements of the array, thus resulting in a value $\theta(m, n)y$ expressed in terms of degrees. The phase shift determination circuitry 204 is also configured to, for each element, combine (sum) the corresponding x and y phase shift values ($\theta(m, n)x + \theta(m, n)y$), thus forming a matrix of resultant phase shift values for each element, i.e., $\theta(m, n)$.

The phase shift values $\theta(m, n)$ may be applied to each corresponding element during Tx and/or Rx operations, which may impart a phase shift/time delay for each phase center of each element. Although not shown in the drawings, it is understood that each element is associated with corresponding Tx and Rx circuitry to enable communication between the array 100 and the target 110. For transmit operations, the beam steering circuitry 200 may also include phase shift application circuitry 206, associated with each element, generally configured to apply a determined phase shift value to the transmit signal operating at frequency (f). The phase shifted signal, for each element, may be expressed as: $((real, imaginary) e^{-j\theta(m, n)})$. It should be noted that, although each element may be transmitting a signal with a phase shift, all of the transmitted signals will combine in far-field free space. For receive operations, the Rx circuitry of each element may apply a corresponding phase shift value. As the phase shifted signals are received from each antenna element, the beam steering circuitry may also include phase alignment circuitry 208 generally configured to remove any phase shift imparted on the Rx circuitry of each element, i.e., so that each signal received at each element is placed in phase with each other. The beam steering circuitry 200 may also include signal combining circuitry 210 generally configured to combine (sum) the collection of in-phase signals from each element, thus forming a resultant signal having a gain increase based on the number of summed in-phase signals.

The DSA array 100 illustrated in FIGS. 1A, 1B and 1C is generally a two-dimensional array. In other embodiments, the DSA array may be implemented as a 3-dimensional array, for example, by arranging the pyramid structures 102 on the surface of 3-dimensional shape (e.g., sphere, cone, cube, etc.). In such embodiments, the teachings of the present disclosure for determining phase gradients and phase shifts may be extended into the 3rd dimension (z-dimension). Thus, for example, the phase gradient determination circuitry 202 may also be configured to determine a z-direction phase gradient as a function of a z-direction offset angle and may be expressed as $PGz = -\sin(Zangle) X (360/(\text{wavelength} (f)))$. In addition, the resultant phase shift values may be expressed as $\theta(m, n, z)$; where z represent the number of z-direction elements.

The DSA array 100 may be used for terrestrial applications such as mounting of the DSA array 100 on a truck, fixed structure, etc. The DSA array 100 may also be used for satellite-to-ground communications in which the array 100 may be generally pointed upward, and/or satellite-to-satellite communications, etc. In some applications, the DSA antenna 100 and/or the target 110 may be moving such that the elevation angle and/or azimuth angle change over time. Accordingly, in some embodiments the phase gradient determination circuitry 202 and/or phase shift determination circuitry 204 are configured to determine the phase gradients and/or phase shifts based on a change in angle of the DSA array 100 relative to the target 110.

The beam steering circuitry 200, described above, may also be used for direction finding to "steer" the array to determine an elevation angle and/or azimuth angle of a known signal of interest. Accordingly, the phase gradient determination circuitry 202 may also be configured to increment/decrement a frequency over a selected frequency band, and also increment/decrement the phase gradients (and thus increment/decrement the phase shift of each element) to "scan" for a selected signal of interest and determine the phase shifts that generate the largest gain for the selected frequency. Since the phase gradients are defined in terms of an angle with respect to the array, a location in space of the target may thus be obtained.

Figure 3A:
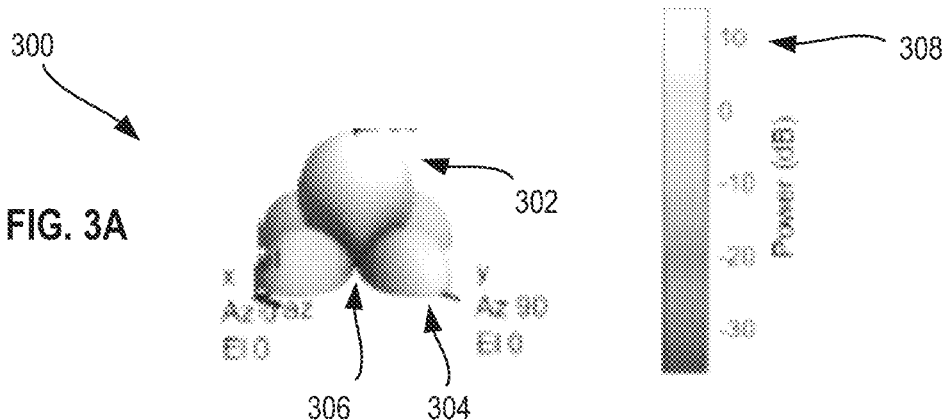
FIGS. 3A, 3B, and 3C illustrate beam patterns for the DSA antenna of FIGS. 1A, 1B, and 1C according to one embodiment of the present disclosure.
Figure 3B:
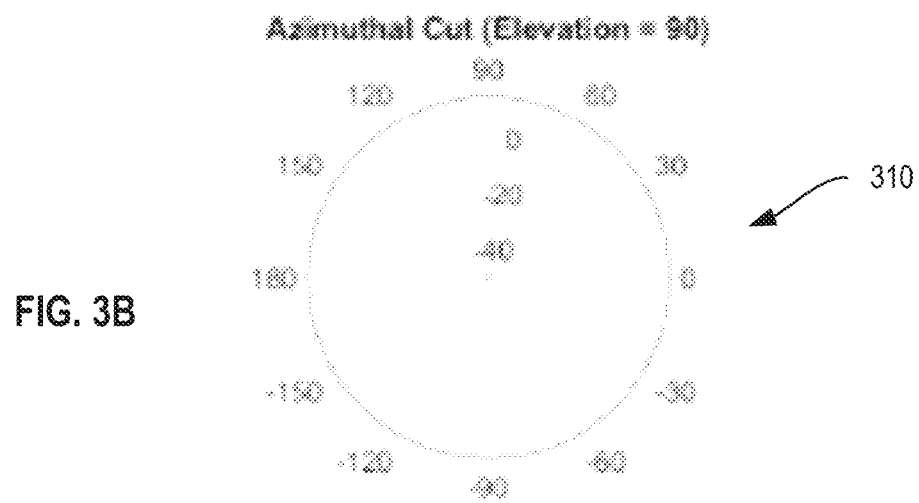
Figure 3C:
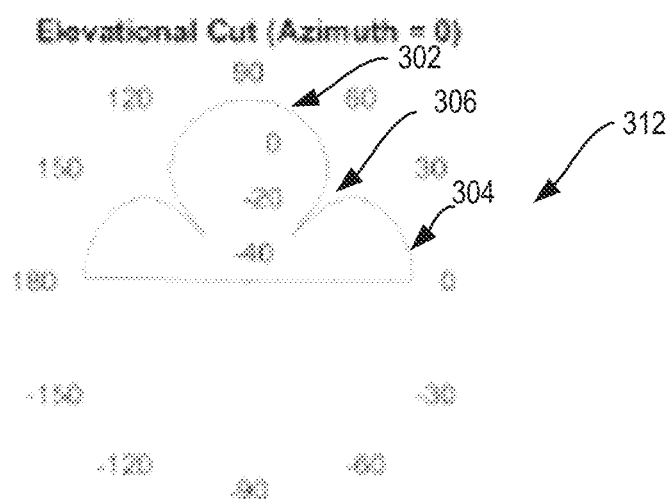

As described above, the beam steering circuitry 200 enables increased gain in signal communications between the array and the target. In some embodiments, there may be a far-field target that is interfering with communications, such as a radio jammer, etc. Accordingly, the beam steering circuitry 200 may also be used to steer an unwanted target into a null position of the antenna array, thus decreasing the gain of the source signal. FIGS. 3A, 3B, and 3C illustrate beam patters for the DSA antenna of FIGS. 1A, 1B, and 1C according to one embodiment of the present disclosure. FIG. 3A illustrates a 3-dimensional graph of a beam pattern of the DSA antenna for a given frequency. As illustrated, the beam pattern includes a main lobe 302, which is directly in front of the DSA antenna, and several side lobes, one of which is labeled 304. The gain characteristics are maximized for Tx and Rx occurring within the main lobe 302 (e.g., when the DSA antenna is steered (described above) so that the main lobe 302 faces the target), and reduced gain when Tx and Rx occur within a side lobe 304. Between the main lobe 302 and side lobes 304 is a null position 306. The null position 306 corresponds to an azimuth angle and an elevation angle (referred to herein as "Null-Az.Ang" and "Null-El.Ang). The gain characteristics are minimized for Tx and Rx occurring within the main lobe (e.g., when the DSA antenna is steered (described above) so that null position 306 faces the target). The power scale 308 illustrates the color-coded relative gain characteristics of the main lobe 302, side lobes 304, and null positions 306, where light denotes increased gain characteristics (power gain in dB) and dark denotes null gain characteristics (e.g., gain reduced by greater than −30 dB). As illustrated, there are typically a plurality of side lobes 304 and a plurality of null positions 306. As stated, the beam pattern is generally based on a design of the DSA antenna (e.g., the number of elements (m×n)) and the operating frequency. The beam pattern illustrated in FIG. 3A assumes a beam pattern for a DSA antenna with 4×4 elements and operating at 8.000 GHz. FIG. 3B illustrates an azimuthal beam pattern 310, and shows the azimuth angles at which a null location can occur, for example, between 60 and 90 degrees. FIG. 3C illustrates an elevational beam pattern 312 and shows the elevation angles at which a null can occur, for example, a null 306 occurs at approximately 45 degrees, between the main lobe 302 and a side lobe 304.

Referring again to FIG. 2, with continued reference to FIGS. 1A, 1B, and 1C, in addition to FIGS. 3A, 3B, 3C, and assuming that the target 110 is identified as a source of a jamming signal, the beam steering circuitry 200 is configured to steer the beam pattern 300 so that a null position 306 is directed toward the target, thus enabling attenuation (nulling) of the jamming signal. Accordingly, the phase shift determination circuitry 204 may also be configured to determine a first null phase shift, for each of the elements, based on the horizontal phase gradient, the position of the element relative to the common origin of the elements of the array, and an azimuthal null angle (Null-Az.Ang.). In particular, the first null phase shift may be determined by multiplying the first phase gradient by the position of the element relative to the common origin of the elements of the array and subtracting or adding the first null angle. Subtracting or adding the first null angle may be based on, for example, the position of the first null angle relative to the main lobe of the beam pattern. The phase shift determination circuitry 204 may also be configured to determine a second null phase shift, for each of the phase centers, based on the second phase gradient, the position of the element relative to the common origin of the elements of the array, and an elevational null angle (Null-ELAng.). In particular, the second null phase shift may be determined by multiplying the second phase gradient by the position of the element relative to the common origin of the elements of the array and subtracting or adding the first null angle. Subtracting or adding the second null angle may be based on, for example, the position of the second null angle relative to the main lobe of the beam pattern.

The phase shift determination circuitry 204 may also be configured to determine a resultant null phase shift, for each element, by summing the respective first and second null phase shifts. The resultant null phase shifts cause the DSA antenna to orient the null position toward the target, thus decreasing a signal strength of a signal received from the target. The null angles for a given operating frequency are illustrated in FIGS. 3A, 3B and 3C.

Figure 4:
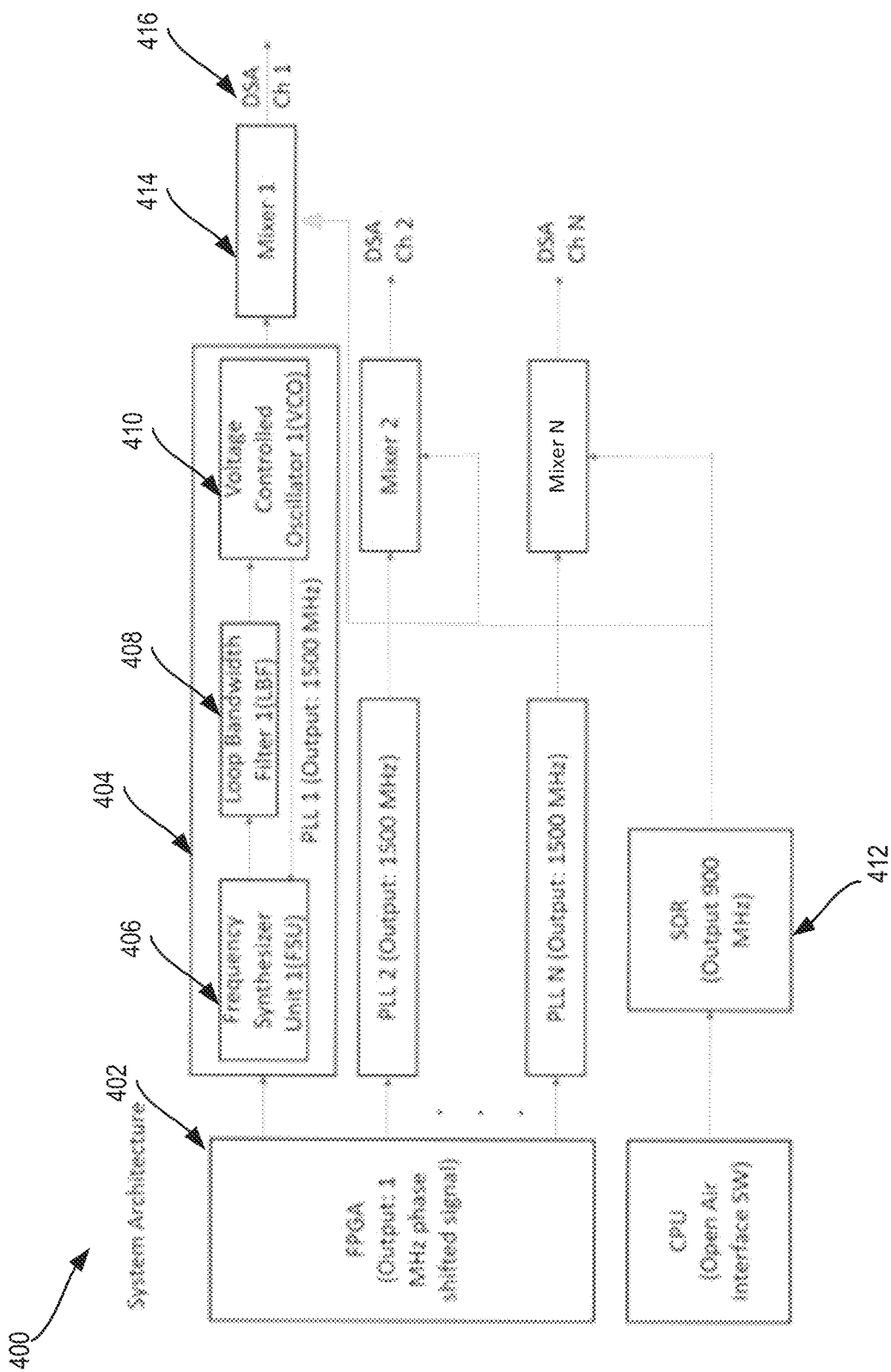
FIG. 4 illustrates beam steering circuitry according to one embodiment of the present disclosure.

FIG. 4 illustrates beam steering circuitry 400 according to one embodiment of the present disclosure. The beam steering circuitry 400 of this embodiment includes phase shift and time delay determination circuitry 402 generally configured to determine phase shift values $\theta(m, n)$ for each respective element of the array, as described above with reference to FIG. 2. The phase shift and time delay determination circuitry 402 is also configured to generate a time delay value, $td(m, n)$, for each respective phase shift values $\theta(m, n)$. The phase shift and time delay determination circuitry 402 is also configured to modulate each respective time delay value using a fixed modulation signal, for example, a 1 MHz modulation signal (referred to herein as a "fixed frequency phase shifted signal").

The beam steering circuitry 400 of this embodiment also include phase lock loop (PLL) circuitry 404 generally configured to boost (increase) the frequency of the fixed frequency phase shifted signal to generate a boosted fixed frequency phase shifted signal. The PLL circuitry 404 includes frequency synthesizer circuitry 406 to generate an intermediary boosted fixed frequency phase shifted signal, bandwidth filter circuitry 408 to provide filtering of the boosted fixed frequency phase shifted signal (e.g., notch filtering, low pass filtering, etc.), and voltage controlled oscillator circuitry 410 to generate a target boosted fixed frequency phase shifted signal as an output from the PLL circuitry 404 and as a reference boosted fixed frequency signal. The reference boosted fixed frequency signal is used as feedback for the frequency synthesizer circuitry 406 to compare to the boosted fixed frequency phase shifted signal to ensure that the boosted fixed frequency phase shifted signal remains at a target boosted frequency.

The beam steering circuitry 400 also includes software-defined radio (SDR) circuitry 412 generally configured to generate a radio signal that includes data. As a general matter, the operating frequency of the SDR circuitry may be in the range of 900 MHz-3.0 GHz. The beam steering circuitry 400 also includes mixer circuitry 414 generally configured to combine the boosted fixed frequency phase shifted signal (generated by PLL circuitry) with the radio signal (generated by the SDR circuitry 412) to generate a resultant time delayed signal 416. The resultant time delayed signal 416 may be applied to a phase center to enable beam steering. The resultant time delayed signal 416 has a frequency value equal to the frequency of the boosted fixed frequency phase shifted signal plus the frequency of the radio signal and includes the data and phase information. For example, assume that the target operating frequency of the DSA antenna is 2.4 GHz. To achieve that value, the boosted fixed frequency phase shifted signal may have a frequency of 1500 MHz and the radio signal may have a frequency of 900 MHz. As illustrated, the PLL circuitry 404 and mixer circuitry 414 may be repeated for each phase/time delay value to independently drive each respective element (pixel) of the antenna array.

Figure 5:
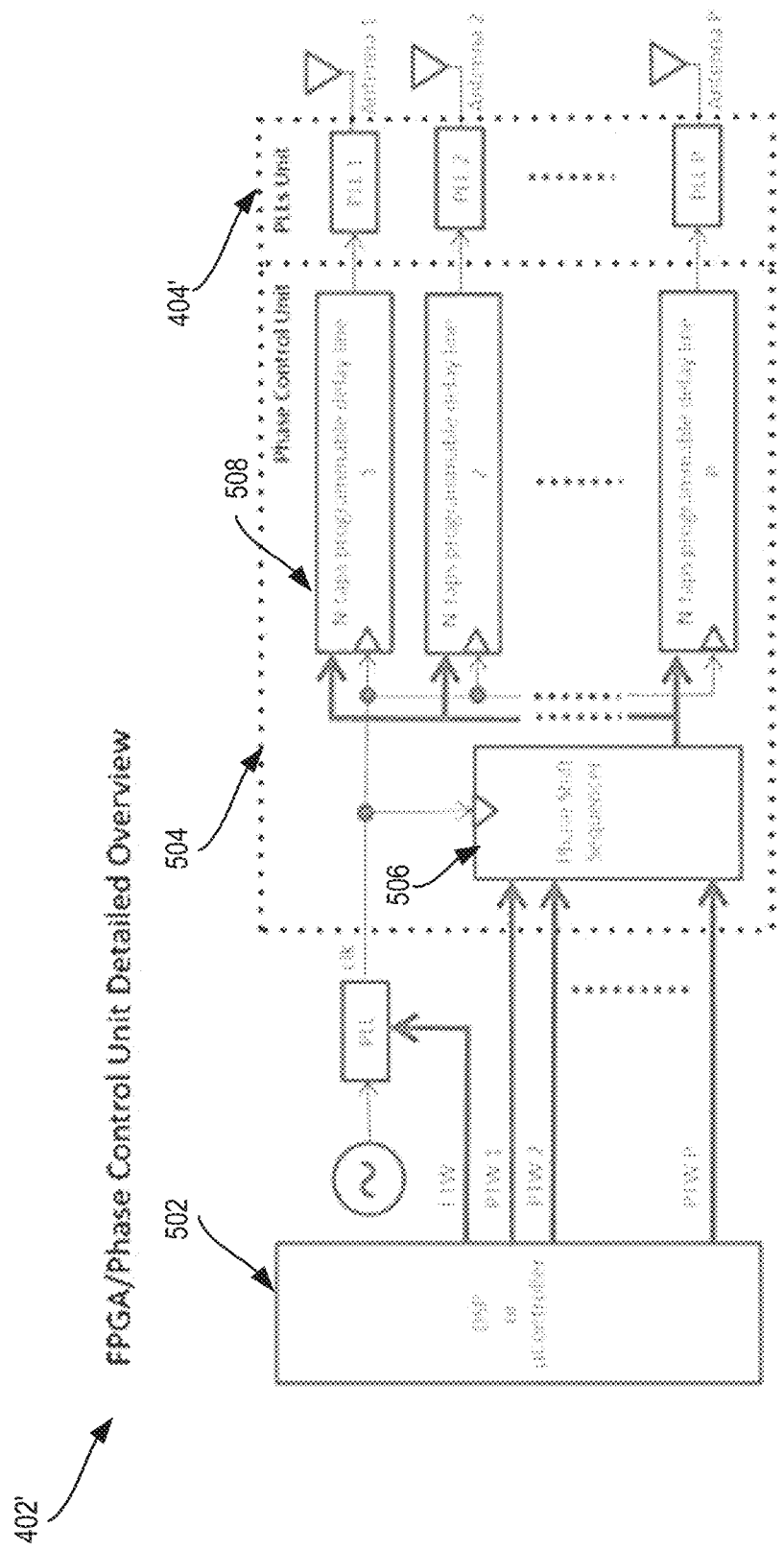
FIG. 5 illustrates phase shift and time delay determination circuitry according to one embodiment of the present disclosure.

FIG. 5 illustrates phase shift and time delay determination circuitry 402' according to one embodiment of the present disclosure. The phase shift and time delay determination circuitry 402' of this embodiment includes processor circuitry 502 (e.g., digital signal processor circuitry, microprocessor circuitry, etc.) to determine phase shift values θ(m, n) for each respective element of the array, as described above with reference to FIG. 2. The phase shift and time delay determination circuitry 402' also includes phase control circuitry 504 generally configured to determine a time delay value, td(m, n), for each respective phase shift value θ(m, n). The phase control circuitry 504 includes phase shift sequencer circuitry 506 configured to sequence the phase shift value θ(m, n) based on a clock value. Since a phase value in the frequency domain corresponds to a time delay value in the time domain, the phase control circuitry 504 also includes time delay circuitry 508 that generates a time delay value based on the phase shift value. The time delay value is an input to the PLL circuitry 404' (described above) to control a corresponding element and apply a time delay. As illustrated, the phase control circuitry 504 may be repeated for each phase/time delay value to independently control each respective element of the antenna array.

Figure 6:
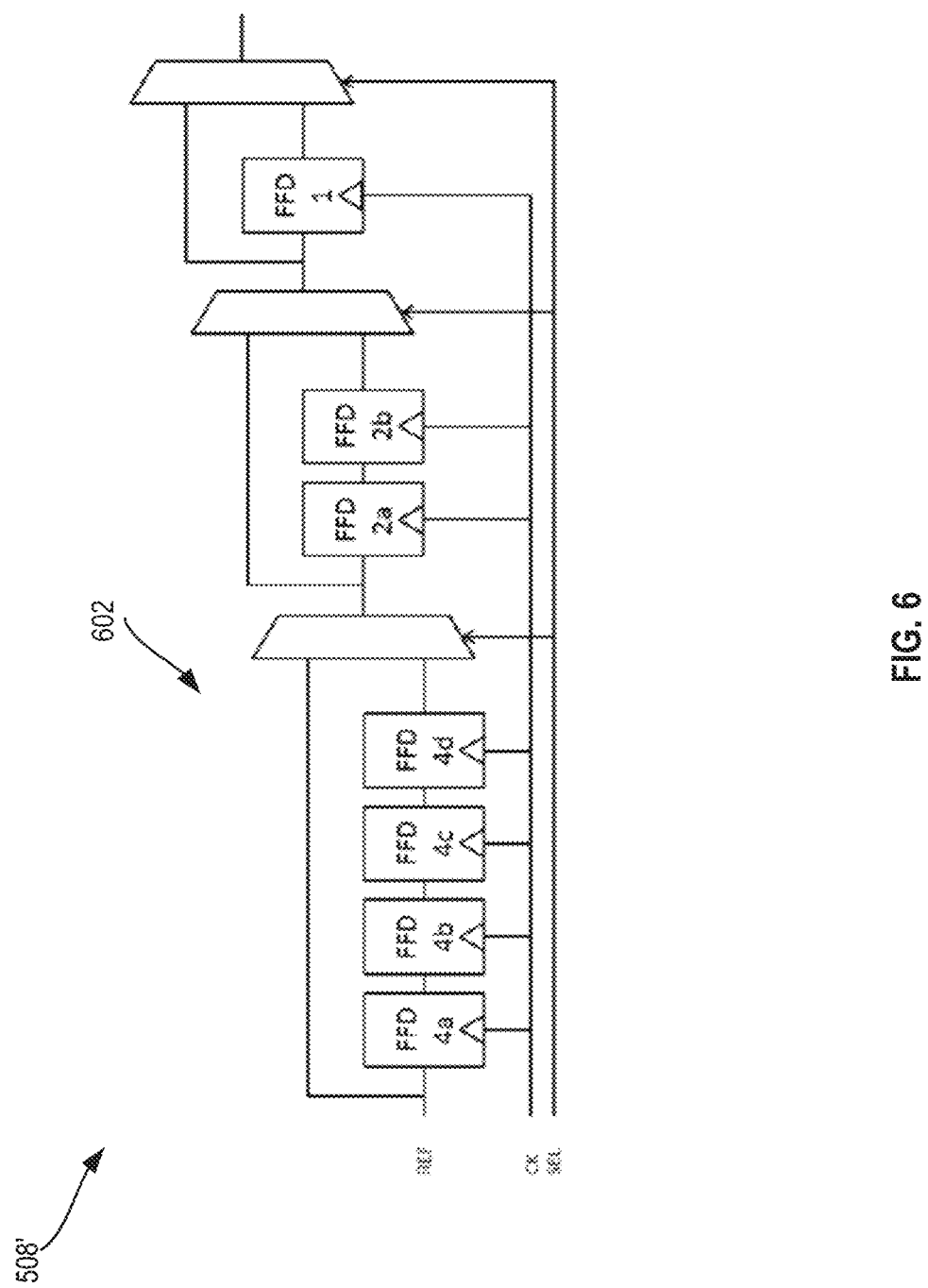
FIG. 6 illustrates time delay circuitry according to one embodiment of the present disclosure.

FIG. 6 illustrates time delay circuitry 508' according to one embodiment of the present disclosure. The time delay circuitry 508' of this embodiment includes a plurality of cascaded flip flop circuits 602. The example illustrated in FIG. 6 depicts a 3-bit resolution time delay that includes a single flip-flop circuit, two flip-flop circuits, and four flip flop circuits which may be combined (turned ON) to generate a selected delay time, the selected delay time corresponds to the phase delay value. Of course, the time delay circuitry 508' of FIG. 6 may be extended to provide greater resolution of time delay values.

Figure 7:
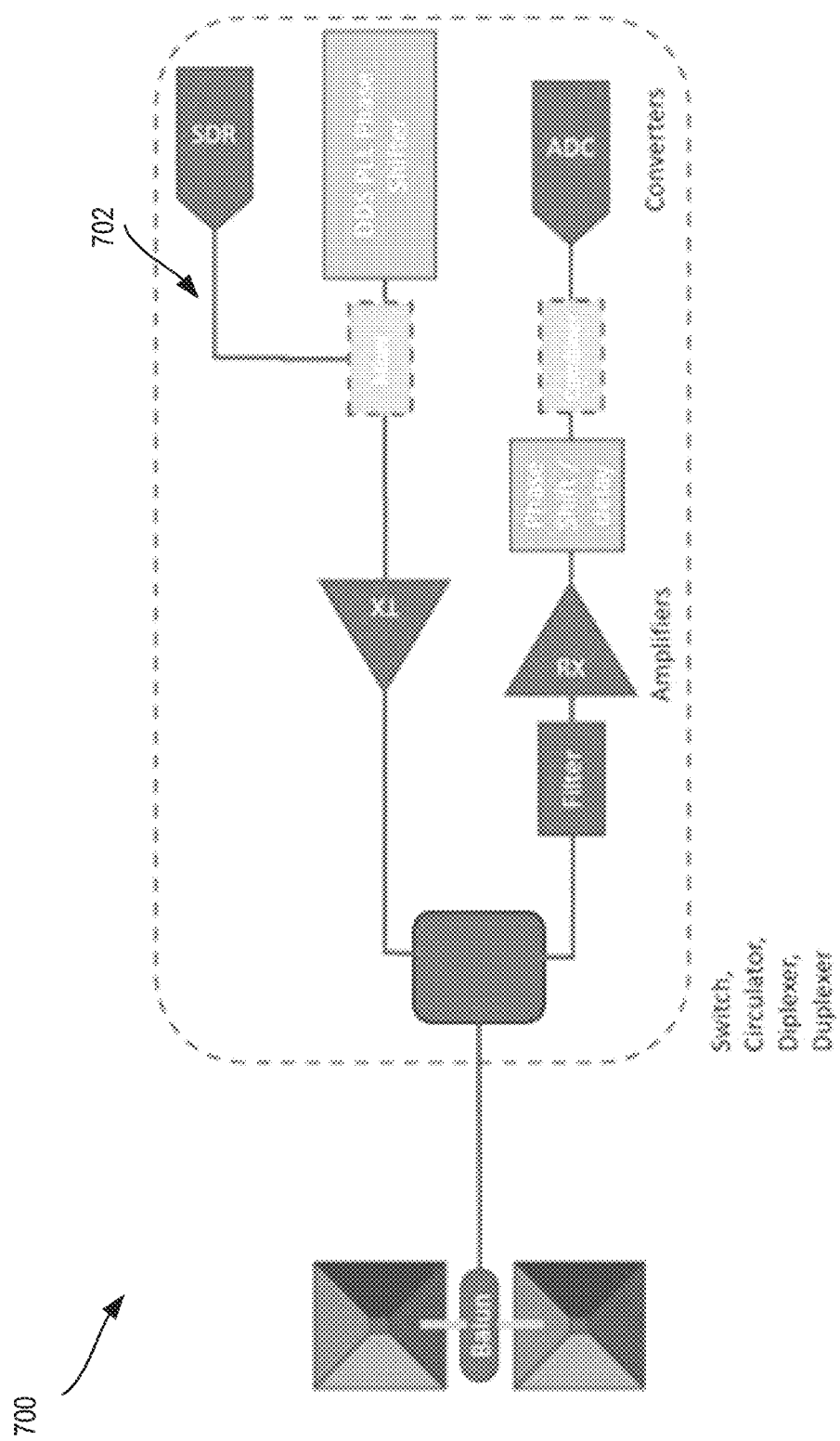
FIG. 7 illustrates a signal chain example according to one embodiment of the present disclosure.

FIG. 7 illustrates a signal chain example according to one embodiment of the present disclosure. As illustrated, the transmit portion 702 is comprised of analog components, thus eliminating digital-to-analog circuitry on the transmit side. Providing an analog solution on the transmit signal chain, as described herein, may enable frequency-independent operations, and may also increase the bandwidth performance of the DSA antenna.

Figure 8:
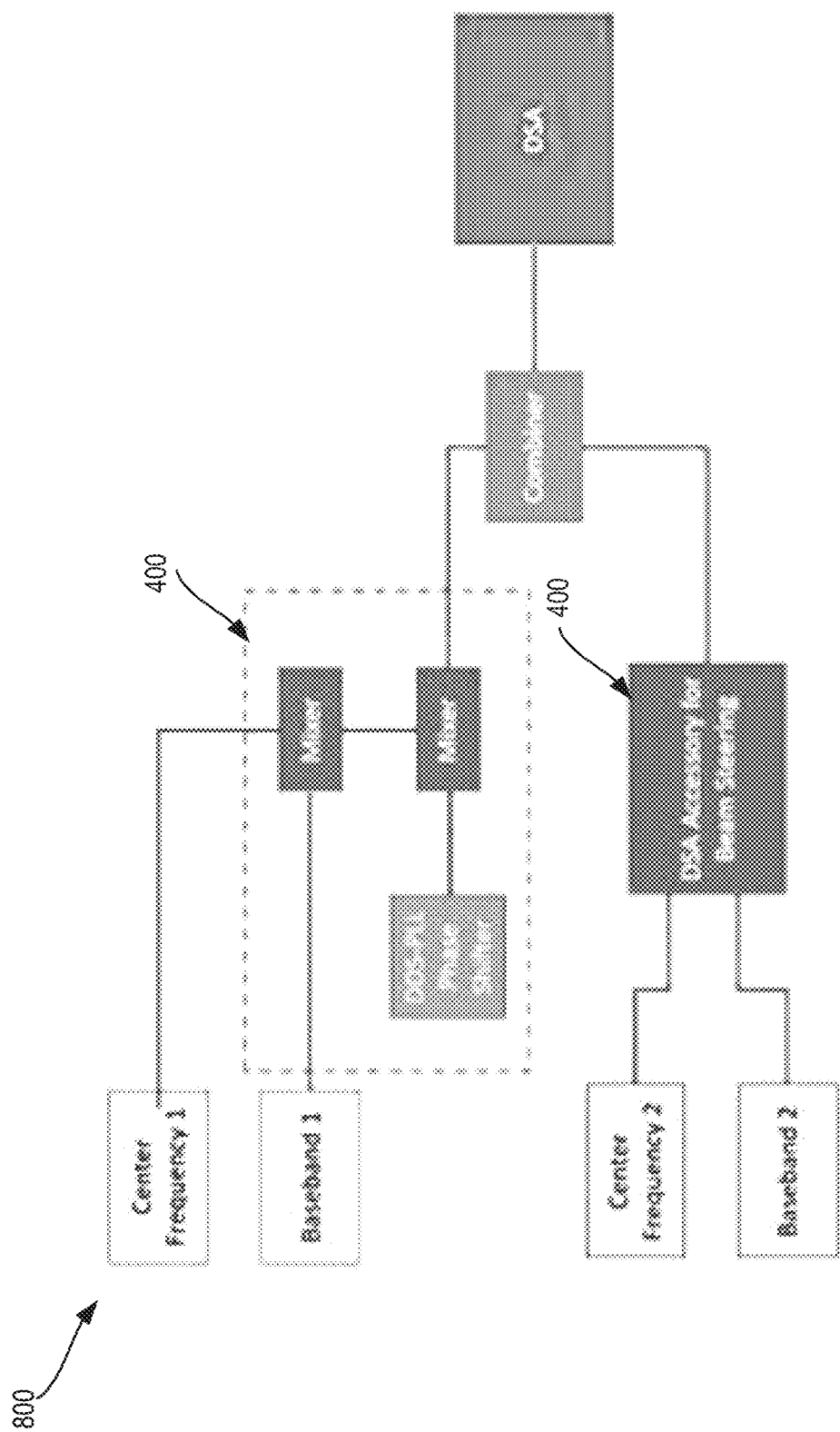
FIG. 8 illustrates beam steering circuitry according to another embodiment of the present disclosure.

FIG. 8 illustrates beam steering circuitry 800 according to another embodiment of the present disclosure. The beam steering circuitry 800 of FIG. 8 illustrates an extension of the concepts described above with reference to FIGS. 4-7, in which multiple instances of the beam steering circuitry 400 may be utilized to enable simultaneous beam steering using unique operating frequencies.

Figure 9:
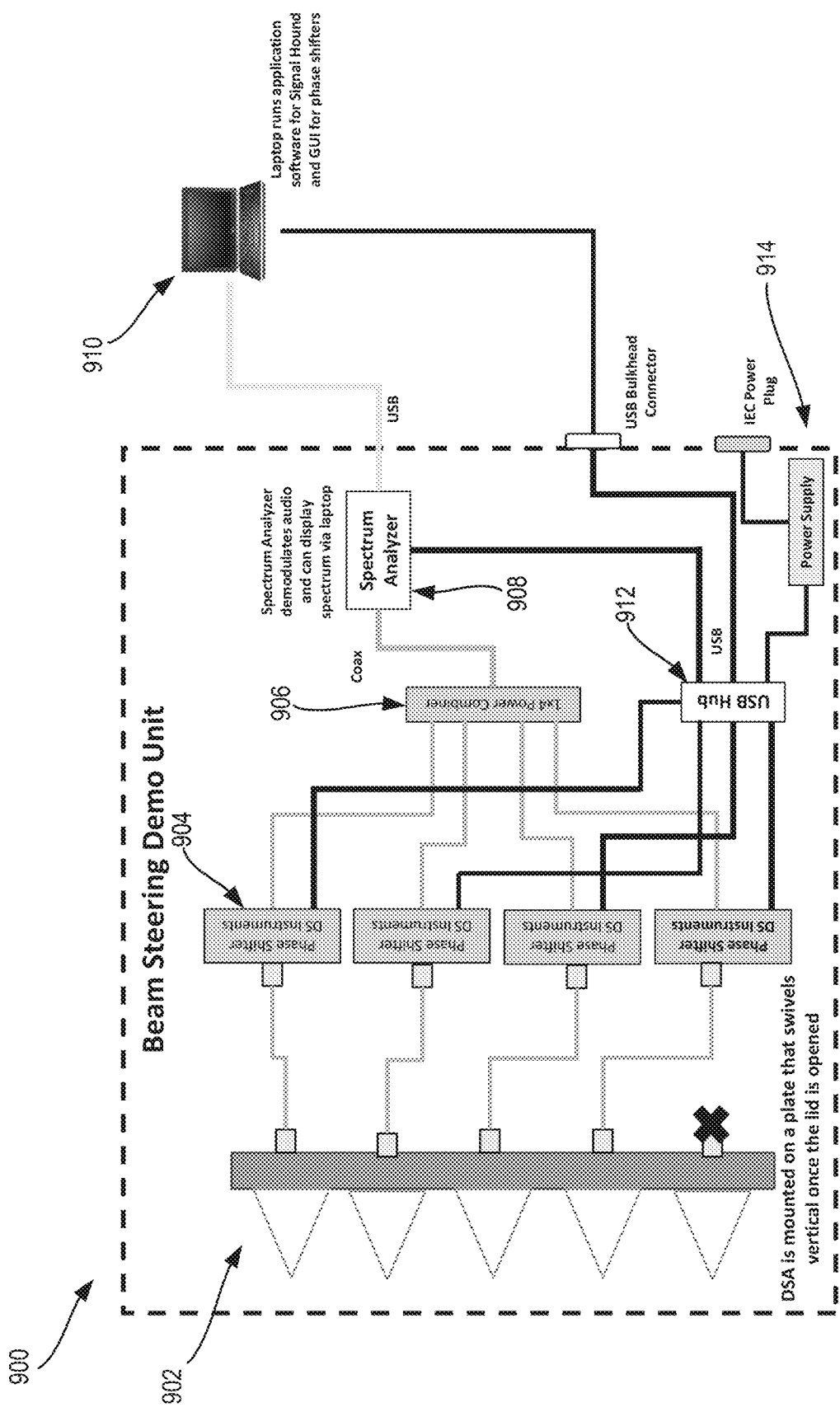
FIG. 9 illustrates a beam steering demonstration system for a DSA antenna according to several embodiments of the present disclosure.

FIG. 9 illustrate a beam steering demonstration system 900 for a DSA antenna according to several embodiments of the present disclosure. The beam steering demonstration system 900 includes a DSA antenna array 902 (illustrated in cross section). The array 902 generally includes a plurality of pyramid structures arranged in an array. At least one face of each pyramid structure faces an adjacent pyramid structure, as illustrated. Opposing faces of two adjacent pyramid structures forms an antenna element. In some embodiments, the pyramid structures are generally identical to one another, and are also generally equidistant from each other, for example, each element is 1" apart from the nearest element. The electromagnetic position of an element is the phase center for that element. Each phase center represents a transmission (Tx) and reception (Rx) point for signals transmitted by, or received by, an element.

The system 900 also includes phase shifting circuitry 904 to control a phase of one or more elements of the array 902, to perform beam steering operations in at least one direction. In one embodiment, the array 902 may be mounted to enable physical movement in an elevation direction, and the phase shifting circuitry 904 may control a phase shift in the azimuth direction. A plurality of phase shifting circuits may be used, for example, to control each element and/or a grouping of elements. The system 900 may also include combiner circuitry 906 to receive phase and data information at a selected operating frequency (from a programmable source like a computer system, etc.) and control each phase shifting circuitry 904 with the same phase and data information at a selected operating frequency.

The system 900 may also include spectrum analyzer circuitry 908 to receive the phase and data information at a selected operating frequency and generate spectrum and/or audio data. The spectrum analyzer circuitry 908 may include a USB-based spectrum analyzer which displays the spectral content of the received signal. For example, in receive (Rx) mode, the spectrum analyzer circuitry 908 may provide a user with visual amplitude and frequency content of the target signal. When the array 902 is beam steered via the phase shifting circuitry 904, the spectrum analyzer circuitry 908 may provide a user with visual change in the direction-dependent amplitude of the target signal, thus providing a visual way of demonstrating the beam steering ability of the DSA array 902. The spectrum analyzer circuitry 908 may also enable demodulation of radio signals so that, for example audio content may be demodulated out of the radio wave and the audio played just like a standard radio. Thus, the spectrum analyzer circuitry 908 may provide a user an audible information of demonstrating beam steering in the receive mode. For example, the spectrum analyzer circuitry 908 may enable increasing and decreasing audible information as the beam is steered to and away from the target.

The system 900 may also include a programmable source 910 (e.g., laptop computer) to generate the phase and data information to be used for beam steering operations of the array 902. In some embodiments, bus interface circuitry 912 (e.g., universal serial bus interface circuitry) to exchange commands and data between the array 902, phase shifting circuitry 904 and/or spectrum analyzer circuitry 908 and the programmable source 910. The system 900 may also include power supply circuitry 914 to provide power to any or all of the components described above.

According to one aspect of the disclosure there is thus provided a beam steering system, the system including a differential segmented array (DSA) antenna comprising a plurality of pyramid structures arranged in an array and a plurality of elements formed in an array comprising a set of first direction elements and a set of second direction elements, wherein each element is defined between opposing faces of two adjacent pyramid structures, and further wherein a position of each element is located at a distance from a common origin of the elements of the array; phase gradient determination circuitry to determine a first phase gradient for the set of first direction elements and to determine a second phase gradient for the set of second direction elements, wherein the first phase gradient and second phase gradient are based on a first angle of a target with respect to the DSA antenna, a second angle of the target with respect to the DSA antenna, and an operating frequency of the DSA antenna; and phase shift determination circuitry to determine a first phase shift, for each of the elements, by multiplying the first phase gradient by the position of the element relative to the common origin of the elements of the array, and to determine a second phase shift, for each of the elements, by multiplying the second phase gradient by the position of the element relative to the common origin of the elements of the array, and to determine a resultant phase shift, for each element, by summing the respective first and second phase shift.

According to another aspect of the disclosure there is thus provided a beam steering system, the system including: a differential segmented array (DSA) antenna comprising a plurality of pyramid structures arranged in an array and a plurality of elements formed in an array comprising a set of first direction elements and a set of second direction elements, wherein each element is defined between opposing faces of two adjacent pyramid structures, and further wherein a position of each element is located at a distance from a common origin of the elements of the array; one or more computer processors; one or more computer readable storage media; and program instructions stored on the one or more computer readable storage media for execution by at least one of the one or more computer processors. The stored program instructions including instructions to: determine a first phase gradient for the set of first direction elements and to determine a second phase gradient for the set of second direction elements, the first and second phase gradients being based on a first angle of a target with respect to the DSA antenna, a second angle of the target with respect to the DSA antenna, and an operating frequency of the DSA antenna; and determine a first phase shift, for each of the elements, by multiplying the first phase gradient by the position of the element relative to the common origin of the elements of the array, and to determine a second phase shift, for each of the elements, by multiplying the second phase gradient by the position of the element relative to the common origin of the elements of the array; and to determine a resultant phase shift, for each element, by summing the respective first and second phase shift.

According to yet another aspect of the disclosure there is thus provided a beam steering system, the system including: a differential segmented array (DSA) antenna comprising a plurality of pyramid structures arranged in an array and a plurality of elements formed in an array comprising a set of first direction elements and a set of second direction elements, wherein each element is defined between opposing faces of two adjacent pyramid structures, and further wherein a position of each element is located at a distance from a common origin of the elements of the array; phase shift and time delay determination circuitry to determine a phase shift value for each element, the phase shift and time delay determination circuitry also to determine a time delay value based on the phase shift value, the phase shift and time delay determination circuitry also to generate a fixed frequency phase shifted signal by modulating the time delay value using a fixed modulation signal; processor circuitry; phase lock loop (PLL) circuitry to increase a frequency of the fixed frequency phase shifted signal to generate a boosted fixed frequency phase shifted signal; software-defined radio (SDR) circuitry to generate a radio signal; and mixer circuitry to combine the boosted fixed frequency phase shifted signal with the radio signal to generate a resultant time delayed signal, the resultant time delayed signal to control the element to apply a phase shift to a phase center.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

"Circuitry", as used in any embodiment herein, may comprise, for example, singly or in any combination, hardwired circuitry, programmable circuitry such as one or more computer processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

Any of the operations described herein may be implemented in a system that includes one or more non-transitory storage devices, including one or more computer readable storage media, having stored therein, individually or in combination, instructions that when executed by circuitry to perform the operations. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. The instructions may be of the form of firmware executable code, software executable code, embedded instruction sets, application software, etc. Other embodiments may be implemented as software executed by a programmable control device. Also, it is intended that operations described herein may be distributed across a plurality of physical devices, such as processing structures at more than one different physical location.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A beam steering system, comprising:
   a differential segmented array (DSA) antenna comprising a plurality of pyramid structures arranged in an array and a plurality of elements formed in an array comprising a set of first direction elements and a set of second direction elements, wherein each element is defined between opposing faces of two adjacent pyramid structures, and further wherein a position of each element is located at a distance from a common origin of the elements of the array;
   phase gradient determination circuitry to determine a first phase gradient for the set of first direction elements and to determine a second phase gradient for the set of second direction elements, wherein the first phase gradient and second phase gradient are based on a first angle of a target with respect to the DSA antenna, a second angle of the target with respect to the DSA antenna, and an operating frequency of the DSA antenna; and
   phase shift determination circuitry to determine a first phase shift, for each of the elements, by multiplying the first phase gradient by the position of the element relative to the common origin of the elements of the array, and to determine a second phase shift, for each of the elements, by multiplying the second phase gradient by the position of the element relative to the common origin of the elements of the array, and to determine a resultant phase shift, for each element, by summing the respective first and second phase shift.

2. The system of claim 1, wherein each respective resultant phase shift is applied to each respective element to cause a change in signal gain of the DSA antenna with respect to the target.

3. The system of claim 1, further comprising phase shift application circuitry to apply each respective phase shift to each element of the DSA antenna to transmit a plurality of phase shifted signals to the target.

4. The system of claim 1, further comprising phase alignment circuitry to remove the resultant phase shift from a signal received at each element to generate a plurality of in-phase signals.

5. The system of claim 4, further comprising signal combining circuitry to sum the plurality of in-phase signals.

6. The system of claim 1, wherein the phase gradient determination circuitry determines a location of a signal of interest by incrementing and/or decrementing the first phase gradient and/or the second phase gradient for a fixed frequency.

7. The system of claim 1, wherein the first phase gradient is determined as:
   cos (first angle of the target with respect to a DSA antenna array)X−cos (second angle of the target with respect to the DSA antenna array)X(360/(wavelength (f))), where wavelength (f) is equal to c/f, c is a speed of light and f is the operating frequency,
   and further wherein the second phase gradient being determined as:
   sin (first angle of the target with respect to the DSA antenna array)X−cos (second angle of the target with respect to the DSA antenna array)X(360/(wavelength (f))), where wavelength (f) is equal to c/f, c is the speed of light and f is the operating frequency.

8. A beam steering system, comprising:
   a differential segmented array (DSA) antenna comprising a plurality of pyramid structures arranged in an array and a plurality of elements formed in an array comprising a set of first direction elements and a set of second direction elements, wherein each element is defined between opposing faces of two adjacent pyramid structures, and further wherein a position of each element is located at a distance from a common origin of the elements of the array;
   one or more computer processors;
   one or more computer readable storage media; and
   program instructions stored on the one or more computer readable storage media for execution by at least one of the one or more computer processors, the stored program instructions including instructions to:
   determine a first phase gradient for the set of first direction elements and to determine a second phase gradient for the set of second direction elements, the first and second phase gradients being based on a first angle of a target with respect to the DSA antenna, a second angle of the target with respect to the DSA antenna, and an operating frequency of the DSA antenna; and
   determine a first phase shift, for each of the elements, by multiplying the first phase gradient by the position of the element relative to the common origin of the elements of the array, and to determine a second phase shift, for each of the elements, by multiplying the second phase gradient by the position of the element relative to the common origin of the elements of the array; and to determine a resultant phase shift, for each element, by summing the respective first and second phase shift.

9. The system of claim 8, further comprising one or more of the following program instructions, stored on the one or more computer readable storage media, to:
   apply each respective resultant phase shift to each respective element to cause a change in signal gain of the DSA antenna with respect to the target.

10. The system of claim 7, further comprising one or more of the following program instructions, stored on the one or more computer readable storage media, to:
    apply each respective phase shift to each element of the DSA antenna to transmit a plurality of phase shifted signals to the target.

11. The system of claim 8, further comprising one or more of the following program instructions, stored on the one or more computer readable storage media, to:
    determine the first phase gradient as:

cos (first angle of the target with respect to a DSA antenna array)X−cos (second angle of the target with respect to the DSA antenna array)X(360/(wavelength (f))), where wavelength (f) is equal to c/f, c is a speed of light and f is the operating frequency; and determine the second phase gradient as:

sin (first angle of the target with respect to the DSA antenna array)X−cos (second angle of the target with respect to the DSA antenna array)X(360/(wavelength (f))), where wavelength (f) is equal to c/f, c is the speed of light and f is the operating frequency.

12. A method for beam steering an antenna, comprising:

determining a first phase gradient for a set of first direction elements of an antenna and determining a second phase gradient for a set of second direction elements of the antenna; the antenna comprising a differential segmented array (DSA) antenna comprising a plurality of pyramid structures arranged in an array; and a plurality of elements formed in an array comprising a set of first direction elements and a set of second direction elements; each element being defined between opposing faces of two adjacent pyramid structures, and a position of each element being located at a distance from a common origin of the elements of the array; the first and second phase gradient being based on a first angle of a target with respect to the DSA antenna, a second angle of the target with respect to the DSA antenna, and an operating frequency of the DSA antenna;

determining a first phase shift, for each of the elements, by multiplying the first phase gradient by the position of the element relative to the common origin of the elements of the array;

determining a second phase shift, for each of the elements, by multiplying the second phase gradient by the position of the element relative to the common origin of the elements of the array; and determining a resultant phase shift, for each element, by summing the respective first and second phase shift.

13. The method of claim 12, further comprising:

removing the resultant phase shift from a signal received at each element to generate a plurality of in-phase signals.

14. The method of claim 12, further comprising:

determining a location of a signal of interest by incrementing and/or decrementing the first phase gradient and/or the second phase gradient for a fixed frequency.

15. A beam steering system, comprising:

a differential segmented array (DSA) antenna comprising a plurality of pyramid structures arranged in an array and a plurality of elements formed in an array comprising a set of first direction elements and a set of second direction elements, wherein each element is defined between opposing faces of two adjacent pyramid structures, and further wherein a position of each element is located at a distance from a common origin of the elements of the array;

phase shift and time delay determination circuitry to determine a phase shift value for each element, the phase shift and time delay determination circuitry also to determine a time delay value based on the phase shift value, the phase shift and time delay determination circuitry also to generate a fixed frequency phase shifted signal by modulating the time delay value using a fixed modulation signal;

processor circuitry;

phase lock loop (PLL) circuitry to increase a frequency of the fixed frequency phase shifted signal to generate a boosted fixed frequency phase shifted signal;

software-defined radio (SDR) circuitry to generate a radio signal; and mixer circuitry to combine the boosted fixed frequency phase shifted signal with the radio signal to generate a resultant time delayed signal, the resultant time delayed signal to control the element to apply a phase shift to a phase center.

16. The system of claim 15, wherein the PLL circuitry comprising:

frequency synthesizer circuitry to apply a selected frequency generate the boosted fixed frequency phase shifted signal based on the fixed frequency phase shifted signal;

filter circuitry to filter the boosted fixed frequency phase shifted signal; and oscillator circuitry to control the frequency synthesizer circuitry to generate the selected frequency.

17. The system of claim 15, wherein the phase shift and time delay determination circuitry comprising:

processor circuitry to determine a phase shift value for the element of the array;

phase control circuitry to determine a time delay value for the phase shift value; and phase shift sequencer circuitry to sequence the phase shift value based on a clock value.

18. The system of claim 17, further comprising phase control circuitry and time delay circuitry to generate the time delay value based on the phase shift value.

19. The system of claim 15, wherein the processor circuitry comprises:

phase gradient determination circuitry to determine a first phase gradient for a set of first direction elements and to determine a second phase gradient for a set of second direction elements, the first and second phase gradients being based on a first angle of a target with respect to the DSA antenna, a second angle of the target with respect to the DSA antenna, and an operating frequency of the DSA antenna; and phase shift determination circuitry to determine a first phase shift, for each of the elements, by multiplying the first phase gradient by the position of the element relative to the common origin of the elements of the array, and to determine a second phase shift, for each of the elements, by multiplying the second phase gradient by the position of the element relative to the common origin of the elements of the array; and to determine a resultant phase shift, for each element, by summing the respective first and second phase shift.

20. The system of claim 19, wherein each respective resultant null phase shift applied to each respective element to cause a change in signal gain of the DSA antenna with respect to the target.

* * * * *